Figure 1:
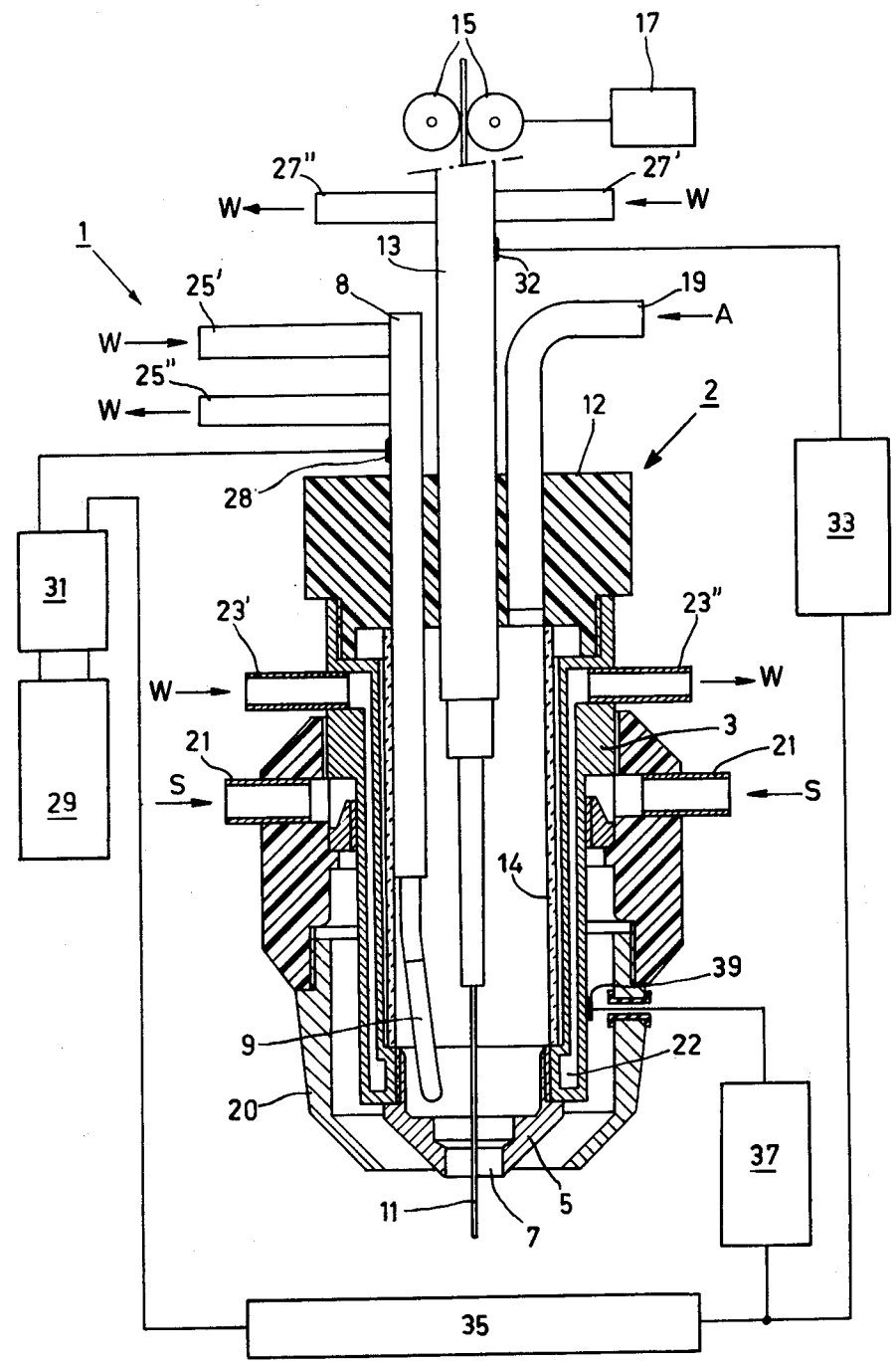

219-121
2/27/79   OR   4,142,090   SR

United States Patent [19]
Essers et al.

[11] 4,142,090
[45] Feb. 27, 1979

[54] METHOD OF AND DEVICE FOR PLASMA MIG WELDING

[75] Inventors: Wilhelmus G. Essers; Gerardus Jelmorini; Gerrit W. Tichelaar, all of Emmasingel, Netherlands

[73] Assignee: U.S. Philips Corporation, New York, N.Y.

[21] Appl. No.: 812,380

[22] Filed: Jul. 1, 1977

Related U.S. Application Data

[63] Continuation of Ser. No. 561,782, Mar. 25, 1975, abandoned.

[30]   Foreign Application Priority Data

Apr. 5, 1974 [NL]   Netherlands .......................... 7404658

[51] Int. Cl.² ............................................... B23K 9/00
[52] U.S. Cl. ................................ 219/121 P; 219/76.16
[58] Field of Search .................... 219/121 P, 76.16, 75

[56]   References Cited
U.S. PATENT DOCUMENTS 4,058,698   11/1977   Bykhovsky ...................... 219/121 P

FOREIGN PATENT DOCUMENTS 1439575   6/1976   United Kingdom ................. 219/121 P

OTHER PUBLICATIONS

Plasma–MIG Welding, B. Pinfold, Dec. 1974, pp. 417–419.

Primary Examiner—J. V. Truhe
Assistant Examiner—Fred E. Bell
Attorney, Agent, or Firm—Thomas A. Briody; Rolf E. Schneider

[57]   ABSTRACT

Plasma MIG welding in which a plasma flow is generated between a non-consumable electrode and a workpiece, and a consumable electrode is fed through such plasma flow toward the workpiece to establish a MIG arc between the same. The current intensity in the plasma flow is increased by applying additional current thereto from an annular auxiliary non-consumable electrode surrounding the plasma flow and positioned between the primary non-consumable electrode and the workpiece.

6 Claims, 2 Drawing Figures

METHOD OF AND DEVICE FOR PLASMA MIG WELDING

This is a continuation of application Ser. No. 561,782, filed Mar. 25, 1975 now abandoned.

This invention relates to a method of and a device for plasma MIG welding, in which a consumable electrode is fed through a nozzle and a MIG arc is maintained in an arc plasma which is generated by maintaining a plasma arc in a gas flow between a non-consumable electrode and a workpiece.

A method of this kind is already known from U.S. Pat. No. 3,612,807. According to this known method, the maximum current intensity of the plasma arc is limited by the dimensions and the cooling power of the non-consumable electrode which is arranged in the housing. For example, a rod-shaped tungsten electrode having a diameter of 6 mm can be loaded with a current of at the most 200 A at positive polarity and under the most favourable circumstances. For welding with higher current intensities, a second non-consumable electrode can be arranged in the housing; however, this arrangement tends to have an adverse effect on the stability of the plasma arc.

The present invention has for its object to provide a method in which more energy can be applied to the arc plasma in a simple manner, without the non-consumable electrode being overloaded or damaged and without deterioration of the stability of the plasma arc.

According to the invention, this object is achieved in that downstream from the non-consumable electrode additional current is applied to the arc plasma by way of an annular auxiliary electrode.

This step increases the current intensity in the arc plasma in a very simple manner; the additional current results in a wider weld, and in better wetting-in at the same penetration than if the additional current were not applied. The adverse influencing of the stability of the plasma arc is prevented by the annular construction of the auxiliary electrode.

In a preferred embodiment of the method according to the invention, the additional current is applied by way of the nozzle which acts as the auxiliary electrode. It is thus possible to perform the method using a welding torch which is known per se, without it being necessary to provide the welding torch with a separate auxiliary electrode.

However, if the nozzle is not used as the auxiliary electrode, for example, because it performs another function, in a further preferred embodiment of the method according to the invention the additional current is applied by way of an auxiliary electrode which is arranged between the nozzle and the workpiece.

This step offers the possibility of advantageously using the nozzle in a different manner in a final preferred embodiment of the method according to the invention, in which the plasma arc is maintained between the nozzle which acts as the non-consumable electrode and the workpiece.

The invention also relates to a device for performing the method; use is made of a device known from the above-mentioned U.S. Pat. No. 3,612,807, including a welding torch comprising a housing having a nozzle with a plasma orifice, a non-consumable electrode, means for supplying a gas, and a contact tube for feeding a welding wire through the plasma orifice, the said device furthermore comprising first and second power supply sources which can be independently controlled, the non-consumable electrode being connected to the first power supply source, whilst the contact tube is connected to the second power supply source; according to the invention, this device is characterized in that there is provided an annular auxiliary electrode which is arranged downstream from the non-consumable electrode and which is connected to a power supply source which is independent of the second power supply source, said auxiliary electrode having the same polarity as the contact tube and the non-consumable electrode.

In a preferred embodiment of the device according to the invention, the auxiliary electrode is connected to a third power supply source which is independent of the first and the second power supply sources. The potential of the auxiliary electrode and the additional current applied to the arc plasma can thus be controlled independently of the current parameters of the plasma arc and of the MIG arc, and can be adapted to other welding parameters such as, for example, the quantity of plasma gas, the nature of the protective gas, and the diameter of the nozzle.

In a further preferred embodiment of the device according to the invention, the auxiliary electrode is connected to the first power supply source via a resistor. This step offers a very simple and cheap construction when the correct polarity is taken into account.

In a still further preferred embodiment of the device according to the invention, the non-consumable electrode is arranged in the housing in known manner; according to the invention, this device is characterized in that the nozzle is constructed as an auxiliary electrode and is provided with means for connection to a power supply source.

By taking this step, existing torches and devices can be very simply made suitable for performing the method according to the invention; the nozzle, normally being electrically insulated with respect to the non-consumable electrode and with respect to the contact tube, need then merely be connected to a power supply source which is independent of the second power supply source, taking into account the correct polarity.

Because in a further preferred embodiment of the device according to the invention the auxiliary electrode has an annular construction and is arranged on the housing downstream from the nozzle, the nozzle is available for other functions; the nozzle can act, for example, as the electrode of the MIG arc which is not transferred in such a case.

However, in a final preferred embodiment of the device according to the invention, the nozzle is constructed as a non-consumable electrode and is connected to the first power supply source. By taking this step, a separate electrode arranged in the housing can be dispensed with, thus enabling a compact welding torch construction of comparatively small transverse dimensions.

The invention will now be described in detail with reference to the accompanying drawings.

Figure 2:
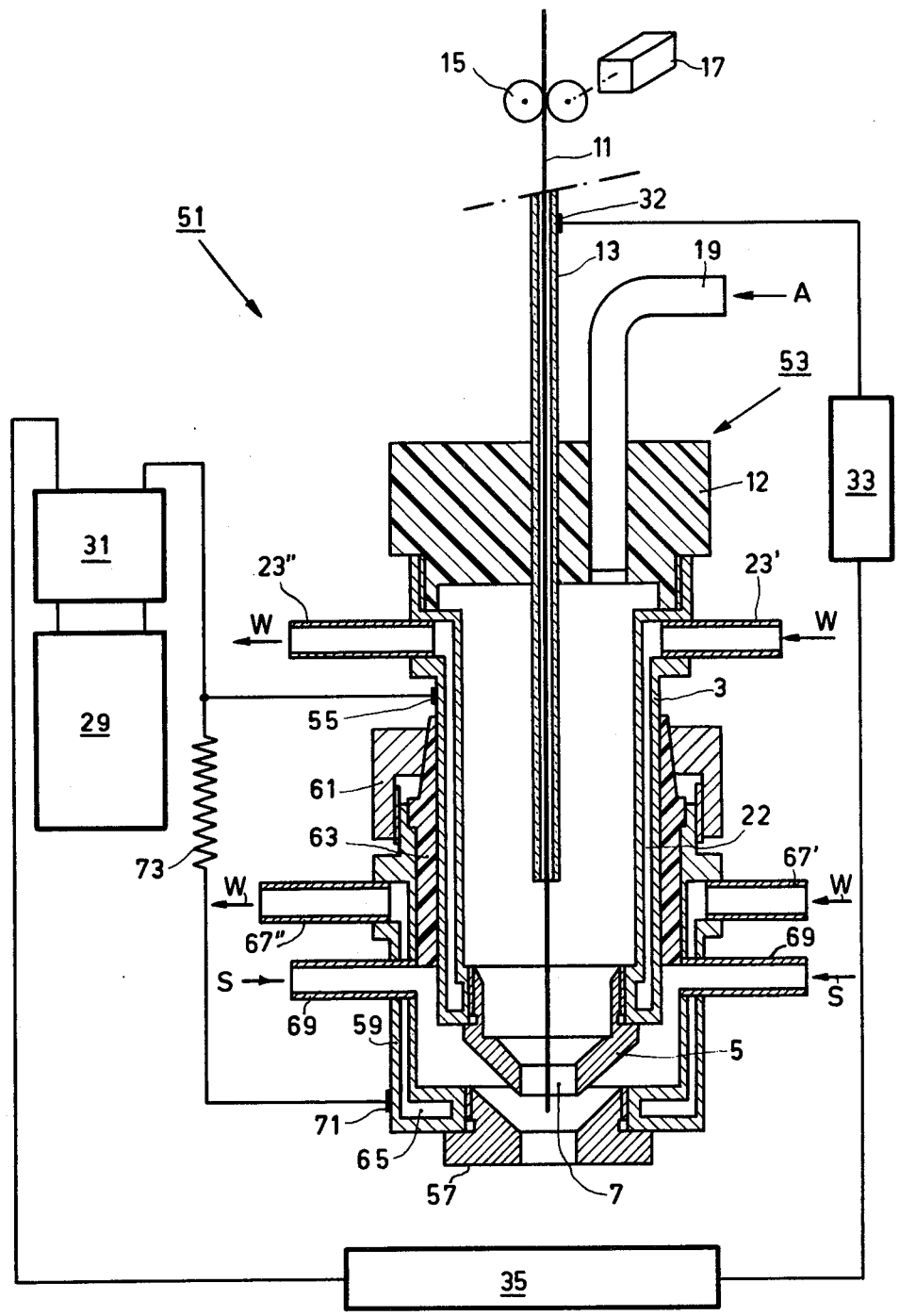

FIG. 1 shows a practical embodiment of a device for performing the method according to the invention, and FIG. 2 shows a further embodiment of the device according to the invention.

The device 1 shown in FIG. 1 comprises a welding torch 2, having a housing 3 provided with a nozzle 5 with a plasma orifice 7. In the housing 3 an electrode holder 8 with a non-consumable electrode 9 of, for example, tungsten, is eccentrically arranged with respect to the plasma orifice 7. A welding wire 11 is guided through the plasma opening 7 by way of a contact tube 13. The electrode holder 8 and the contact tube 13 are fixed in a cover 12 of insulating material, with the result that the housing, the contact tube and the non-consumable electrode are electrically insulated with respect to each other. An insulating lining 14 is provided on the inner wall of the housing.

The welding wire 11 is fed by means of transport rollers 15 which are driven at a controllable speed by a motor 17. The welding torch 2 is furthermore provided with a supply duct 19 for the supply of a plasma gas A, for example, argon. Connections 21 and a shield 20 serve for the supply of a protective gas S, for example, a mixture of argon and carbon dioxide. The housing 3, the electrode holder 8 and the contact tube 13 are provided with cooling ducts, only the cooling duct 22 of the housing 3 being shown in the drawings. The cooling ducts communicate with connections 23' and 23", 25' and 25", 27' and 27" for the supply and discharge of cooling water W. The non-consumable electrode 9 is connected, via a connection contact 28 on the electrode holder 8, to one of the poles of a power supply source 29 via a high-frequency generator 31. The welding wire 11 is connected, via a connection contact 32 on the contact tube 13, to one of the poles of a second power supply source 33. A workpiece 35 is connected to the other pole of the two power supply sources 29 and 33.

According to the invention, the nozzle 5 is constructed as an auxiliary electrode and is connected to one of the poles of a third power supply source 37 via a connection contact 39 on the housing 3. The other pole of the power supply source 37 is connected to the workpiece 35. The tungsten electrode 9, the contact tube 13 and the nozzle 5 have the same polarity.

For the welding by means of the described device, the electrode 9, the contact tube 13, the nozzle 5 and the workpiece 35 are connected in the described manner to the power supply sources 29, 33 and 37. A plasma gas A is supplied via the supply duct 19. A protective gas S is supplied via the connections 21. By means of the current source 29 and the high-frequency generator 31, a plasma arc is struck in the plasma gas flow and is maintained between the tungsten electrode 9 and the workpiece 35. By way of the transport rollers 15, the welding wire 11 is fed and guided through the plasma orifice 7 via the contact tube 13. Between the welding wire 11 and the workpiece 35 a MIG arc is struck and maintained by means of the power supply source 33. The welding wire 11 is melted in the arc plasma which is generated by the plasma arc.

The current intensity of the plasma arc is limited by the maximum permissible load of the tungsten electrode 9. In order to enable welding at higher current intensities without overloading the tungsten electrode 9 and without disturbing the stability of the plasma arc, additional current is applied to the already present arc plasma; this additional current is applied to the arc plasma by the power supply source 37 via the connection contact 39, the housing 3 and the nozzle 5.

Using an embodiment of the device which was tested in practice, an additional current of more than 300 A can be applied to the arc plasma without difficulty. At a constant current intensity of 200 A in the welding wire, the width of the weld was doubled by increasing the current intensity in the arc plasma from 20 A to 350 A, and the wetting-in was improved at practically the same penetration.

FIG. 2 shows a further embodiment of the device according to the invention, identical elements being denoted by the same references as in FIG. 1. This device 51 comprises a welding torch 53, the nozzle 5 of which serves as a non-consumable electrode for the plasma arc. In contrast to the embodiment shown in FIG. 1, the separate electrode arranged in the housing is dispensed with. The nozzle 5 is connected to the power supply source 29 via a connection contact 55 or the housing 3. In this case the additional current supply is effected via an annular auxiliary electrode 57. The anxiliary electrode is mounted on a sleeve 59 which is mounted on the housing 3 by means of a ring nut 61. The sleeve 59 with the auxiliary electrode 57 is insulated with respect to the housing 3 by means of an annular insulating member 63. The sleeve 59 has a double-walled construction and is provided with cooling ducts 65 and connections 67' and 67" for the supply and discharge of cooling water W. A protective gas S can be supplied via connections 69.

For the supply of additional current, the auxiliary electrode could be connected, as in the embodiment of FIG. 1, to a third power supply source which is independent of the two power supply sources 29 and 33. However, because in the present device the auxiliary electrode is connected, by way of a connection contact 71 on the sleeve 59, to the power supply source 29, i.e. via a resistor 73, a separate third power supply source is not required, so that a simpler and less expensive construction of the device is possible. As in the embodiment of FIG. 1, the correct polarity should be taken into account for this device, i.e. the nozzle 5, the contact tube 13 and the auxiliary electrode 57 should have the same polarity.

In the device according to FIG. 1, the nozzle acting as the auxiliary electrode could similarly be connected to the power supply source 29 via a resistor.

The nozzle acting as an electrode as well as the annular auxiliary electrode can be made of tungsten or of water-cooled copper. The service life of a copper electrode can be enhanced by providing it with inserts of a high-melting metal, for example, tungsten.

Welding can be done with alternating current or direct current, with positive as well as with negative polarity, as long as the welding wire and the two electrodes, the tungsten electrode and the nozzle or the nozzle and the auxiliary electrode, have the same polarity.

In the described embodiments a transferred MIG arc is maintained between the welding wire and the workpiece. However, the steps according to the invention can be equally advantageously taken for methods and devices in which a non-transferred MIG arc is maintained between the welding wire and an auxiliary electrode other than the workpiece. To this end, for example, the welding torch of the device shown in FIG. 1 could be provided with an annular auxiliary electrode, the plasma arc then being maintained between the tungsten electrode and the workpiece, whilst the MIG arc is maintained between the welding wire 11 and the auxiliary electrode, additional current being applied via the nozzle.

What is claimed is:

1. A method of plasma MIG welding, which comprises establishing a plasma arc between a primary non-consumable electrode and a workpiece to initiate and sustain a plasma flow, feeding a consumable electrode through said plasma flow toward said workpiece, establishing a MIG arc between said consumable electrode and said workpiece, increasing the current intensity in the plasma flow by applying additional current thereto from an annular auxiliary non-consumable electrode surrounding said plasma flow and positioned between said primary non-consumable electrode and said workpiece, and maintaining said primary non-consumable electrode, said consumable electrode and said annular auxiliary non-consumable electrode at the same polarity.

2. A method according to claim 1 in which said primary non-consumable electrode is provided by the nozzle of a welding torch.

3. A plasma MIG welding apparatus, which comprises a welding torch provided with a primary non-consumable electrode; first circuit means including a first power supply, said primary non-consumable electrode and a workpiece for establishing a plasma arc between said primary non-consumable electrode and said workpiece to initiate and sustain a plasma flow; means for feeding a consumable electrode through said plasma flow toward said workpiece; second circuit means including a second power supply, said consumable electrode and said workpiece for establishing a MIG arc between said consumable electrode and said workpiece; an annular auxiliary non-consumable electrode surrounding said plasma flow and positioned between said primary non-consumable electrode and said workpiece; and an auxiliary circuit means including a third power supply, said annular auxiliary non-consumable electrode and said workpiece for applying additional current to the plasma flow to increase the current intensity therein; said first, second and third power supplies being independently controllable; and said primary non-consumable electrode, said consumable electrode and said annular auxiliary non-consumable electrode having the same polarity.

4. Apparatus according to claim 3, in which said primary non-consumable electrode is provided by the nozzle of said welding torch.

5. A plasma MIG welding apparatus, which comprises a welding torch provided with a primary non-consumable electrode; first circuit means including a first power supply, said primary non-consumable electrode and a workpiece for establishing a plasma arc between said primary non-consumable electrode and said workpiece to initiate and sustain a plasma flow; means for feeding a consumable electrode through said plasma flow toward said workpiece; second circuit means including a second power supply, said consumable electrode and said workpiece for establishing a MIG arc between said consumable electrode and said workpiece; an annular auxiliary non-consumable electrode aurrounding said plasma flow and positioned between said primary non-consumable electrode and said workpiece; and an auxiliary circuit means including said first power supply, a resistor means, said annular auxiliary non-consumable electrode and said workpiece for applying additional current to the plasma flow to increase the current intensity therein; said first and second power supplies being independently controllable; and said primary non-consumable electrode, said consumable electrode and said annular auxiliary non-consumable electrode having the same polarity.

6. Apparatus according to claim 5, in which said primary non-consumable electrode is provided by the nozzle of said welding torch.

* * * * *